(12) United States Patent
Olivas

(10) Patent No.: US 6,646,567 B1
(45) Date of Patent: Nov. 11, 2003

(54) WIRELESS TELEMATIC THERMOMETER

(76) Inventor: Benjamin Martinez Olivas, Calle Gilberto Martinez 34-4, 03204 Elche (Alicante) (ES)

( * ) Notice: Subject to any disclaimer, the term of this patent is extended or adjusted under 35 U.S.C. 154(b) by 455 days.

(21) Appl. No.: 09/693,728

(22) Filed: Oct. 20, 2000

(30) Foreign Application Priority Data

May 14, 1998 (ES) .............................................. 9801017

(51) Int. Cl.[7] .............................................. G08C 19/16
(52) U.S. Cl. .............................. 340/870.17; 340/573.1; 600/549; 128/903
(58) Field of Search ........................ 340/870.17, 573.1, 340/870.26; 600/549; 128/903

(56) References Cited

U.S. PATENT DOCUMENTS

| | | | |
|---|---|---|---|
| 4,306,569 A | * 12/1981 | Weil et al. ................... | 600/549 |
| 4,747,413 A | * 5/1988 | Bloch ..................... | 340/870.17 |
| 4,854,328 A | 8/1989 | Pollack | |
| 4,981,139 A | * 1/1991 | Pfohl .......................... | 600/549 |
| 5,844,862 A | * 12/1998 | Cocatre-Zilgien ........... | 600/549 |
| 6,373,392 B1 | * 4/2002 | Au ........................... | 340/573.1 |

FOREIGN PATENT DOCUMENTS

| WO | WO 94/25841 | 4/1994 |
|---|---|---|
| WO | WO 97/31249 | 2/1997 |

\* cited by examiner

*Primary Examiner*—Timothy Edwards
(74) *Attorney, Agent, or Firm*—Michael A Mann; Nexsen Pruet Jacobs & Pollard LLC

(57) ABSTRACT

A wireless telematic thermometer for remote measurement of a human or animal body on the basis of information transmitted by a transmitting module and received by a receiving module, in which the temperature evaluation is carried out in the receiving module, the transmitting module having a probe that is permanently in contact with the body, for obtaining digital sequences which are periodically sent to the receiver, with the cooperation of a transistor controlled by a microprocessor. The receiver has receiving means associated with a microprocessor, which controls movement recorders for displaying the information on a viewing screen; it also has acoustic and luminous warning means.

4 Claims, 1 Drawing Sheet

WIRELESS TELEMATIC THERMOMETER

OBJECT OF THE INVENTION

The present invention refers to a wireless telematic thermometer which offers essentially new characteristics and notable advantages with respect to similar apparatus that are known and used for the same purposes in the present state of the art.

More specifically, the invention proposes the development of a thermometric apparatus, consisting of two separate and independent modules, one of which functions as a transmitter and the other as a receiver, for remote measuring of the temperature of the human or animal body to which the transmitter is attached, in such a way that evaluation of the temperature of the said body is carried out in the receiving module by virtue of the information received from the transmitter by radio-frequency, the said receiving module being also capable of controlling the correct operation of the transmitting module, as well as warning of any anomaly that may arise in the latter.

The field of application of the present invention is within the industrial sector devoted to the manufacture and/or use of telematic apparatus, with special attention to the field of medical care and the like.

BACKGROUND AND SUMMARY OF THE INVENTION

In the present state of the art many different apparatus are known that are intended for the measurement of body temperature, whether this be human or animal. Among all of these apparatus, some specific types use digital technology and, after the necessary period of measurement, provide the user with information about the temperature measured on an indicator screen on which the value obtained may be directly viewed.

However, there are many situations in which it is necessary to know the temperature of a body which is normally situated at a certain distance from the person who has to obtain and use that information. This is the case of those persons or animals which must, for medical or any other reasons, be permanently subject to a strict control of their temperature, in order to check whether it is or not within a band of predetermined limits. In these cases the use of thermometers of the type mentioned, by means of which the desired values are obtained locally, is not sufficient for the required purposes.

Consequently, in an attempt to offer solutions to the specific problem presented, apparatus have been developed, including that which is described in the Patent application PCT No. WO 94/25841, which may be considered as the closest background to that of the present invention, and by means of which a local thermometer is developed which is capable of sending a warning signal when the body temperature to be controlled is not within the predetermined band. Although it was an important step with respect to the methods used up to that time, this apparatus of the previous state of the art does not definitively resolve the problem presented, as it suffers from the disadvantage that it can only inform that there is an anomalous temperature in the controlled body, but cannot inform as to the value of the measured temperature; this value has to be consulted directly from the apparatus attached to the body to be controlled. Moreover, it also has the severe disadvantage that in the event that the apparatus attached to the body stops working because of a fault or failure, this circumstance cannot be detected by the receiving part, simply because no signal is sent.

As will be easily understood, a situation in which it is necessary to control the temperature of a body must be able to count on the use of means which ensure a much more effective operation.

Therefore, there is a practical need for the creation of such means, this being the aim which the present invention proposes, fundamentally, to achieve.

To this end, the thermometer which is to be described hereinbelow, has been developed as a wireless, telematic apparatus which allows remote measurement to be carried out of the body to be controlled, that is, in the remote position occupied by the person responsible for carrying out the said control, without having to go to the apparatus carried by the said body in order to effect the check, as would occur in the case of the apparatus mentioned above.

To this end, the thermometer has been made up of two separate, independent modules, which may be interconnected by radio-frequency, the smaller of which is attached to the body to be controlled and sends the measured data, periodically, to the other module, which is in the remote position and which carries out all the necessary evaluations for determining the exact situation affecting the said body. This operation, based on the periodic transmission of data, allows the receiver to detect any anomaly which may arise in the transmitter, whether due to a failure, in which case it would stop transmitting and therefore signals would not be received in the expected periods, or because the temperature indication is received in time periods different from those programmed, or because the temperature values measured make it clear that such an anomaly exists, as may occur, for example, in the event that the probe stops being in contact with the body. Therefore, and in contrast to the mentioned apparatus of the previous state of the art, as may be deduced from the foregoing, the indications and warnings are produced exclusively in the receiving module, thus preventing consequent annoyances for the transmitter carrier.

In accordance with the preferred embodiment of the telematic thermometer of the present invention, the same is made up of a transmitting module of small size and little weight, which may be adjusted to the body of the person or animal whose temperature is to be controlled, with which it is in contact, so that this module will be manufactured with materials considered anti-allergic and will incorporate a peg or similar means for attaching it to a garment. This module incorporates an electronic system designed to have a very low consumption, for which reason it will not incorporate viewing screens or the like, nor buttons, switches, etc., its operation being limited to obtaining the temperature and sending it to the other module, or receiver, in the form of digital codes. The said transmitting module includes a heat-resistant probe associated with a microprocessor which transforms the said probe's instantaneous resistance values into corresponding temperature values; the said microprocessor also controls the all/nothing modulation of a radio-frequency transmitting circuit, whose frequency stability is controlled by a quartz crystal which oscillates within the permitted frequency range for tele-control and tele-measurement operations. The unit is supplied electrically from an internal power source, which will preferably be made up, by virtue of the low consumption of electrical energy, by a condenser of appropriate capacity, which can provide power for a predetermined period of time, preferably not less than 12 hours, and may be re-charged afterwards by using the other module, that is, by the receiving module, by means of the electrical contacts provided for this purpose.

For its part, the receiving module incorporates means that are tuned in frequency with the transmitter, by means of which the sequences received from the said transmitter are transformed into electrical signals to be applied to the internal microprocessor, which are stabilised in frequency by means of a quartz crystal. The said microprocessor controls a group of movement recorders, by means of which a viewing screen is controlled, specifically a liquid crystal screen, on which the relevant information is displayed. Also, the receiver has a number of buttons by means of which a selection may be made of the information one wishes to view, as well as to programme the parameters of the apparatus (alarm temperature, measurement system in °C./°F., . . . etc.). Moreover, the module incorporates warning means, both acoustic (for example, a piezoelectric buzzer) and luminous (for example, a Led diode), which are activated in different sequences depending on the warnings produced.

For its part, the receiving module may receive its power from a battery or the like, although the inclusion of an appropriate input for connection to a suitable power supply has been provided for. In a complementary way to the transmitting module, the receiver has been provided with electrical contacts, intended for connection to those of the transmitter, to carry out re-charging of the transmitter's supply system, as well as other electrical connections to establish a communication, controlled by the receiver, for communicating to the transmitting module the identification code of the latter, which must be transmitted as a key together with the data concerning each measurement carried out.

Complementarily, the receiver may be equipped with other additional devices which allow it to fulfill other previously determined functions. For example, the preferred embodiment has been provided with a serial-type, digital information port, through which communication may be established with a computer, using the appropriate interface device, so that the measurements may be processed, stored or displayed on the same, as desired Moreover, the receiving module will incorporate a conventional clock with programmable alarm, whose time information will be displayed together with the value of the instantaneous temperature. The said clock will be installed preferably in the microprocessor itself, in such a way that it will not require the use of external components.

Finally, with respect to the necessary programme for carrying out the different functions in the receiver, it is to be understood that, preferably, it will be installed in the said microprocessor, once manufacture of the apparatus is finished, by means of different contact points provided for this purpose in the printed circuit itself.

BRIEF DESCRIPTION OF THE DRAWINGS

Further characteristics and advantages of the invention will become clear from the detailed description of the preferred embodiment of the invention given hereinbelow, to be taken as an illustrative and non-restrictive example, with reference to the accompanying drawings, in which.

DESCRIPTION OF THE PREFERRED EMBODIMENT

In accordance with the foregoing explanation, the detailed description of the preferred embodiment of the invention will be carried out on the basis of the example shown, diagrammatically, in both Figures of the drawings. Thus, firstly with reference to the electrical plan of FIG. 1, belonging, as mentioned above, to the transmitting module, it may be observed that a central block (1) appears in the same, which represents the microprocessor used in this module, as well as a group of components distributed around the same, to provide the rest of the functions assigned to this module. In this sense, there is a transistor (2), to the collector of which a parallel resonant circuit is associated for transmitting the relevant signals to the receiving module; this transistor oscillates at a controlled frequency, preferably by means of a quartz crystal (3). The said microprocessor (1), carries out the all/nothing modulation of the transmitting circuit thus constituted through its connection to the base of the transmitter, so as to be able to send digital codes which correspond to the numeric values of the temperatures measured.

Figure 1:
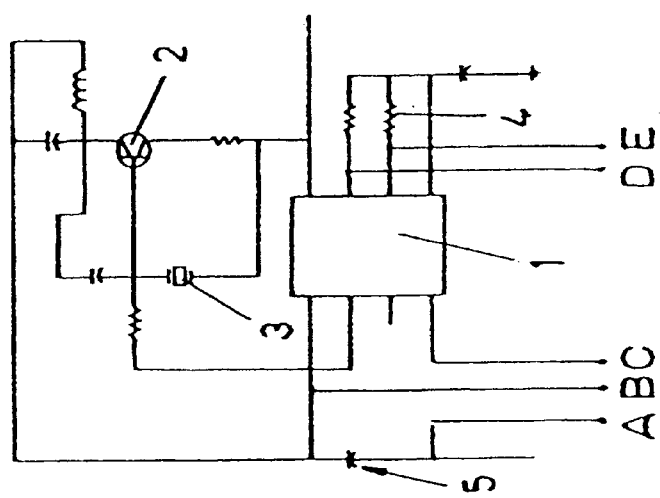
FIG. 1 shows a diagram of an electrical plan belonging to an example of an embodiment of a transmitting module in accordance with the invention.

As explained hereinbefore, the thermometer uses an appropriate probe as a means of measuring the temperature, which is preferably constituted by a variable temperature coefficient resistance, preferably of the NTC type, which is indicated by the reference (4) in the plan of FIG. 1. In the practical embodiment of the invention, this negative temperature coefficient (NTC) is housed inside, and in contact with, a small capsule made of very heat conductive metal, so that any temperature variation of the body to be controlled will cause a corresponding variation in the resistive value of the probe (4), and so that this variation may be interpreted and translated by means of the microprocessor (1) in the corresponding code indicating this new temperature value.

The numerical reference (5) indicates a condenser, whose capacity will have a high value and will be determined according to the consumption of the rest of the circuit. As mentioned above, the circuit's consumption is very low, the charge of the said condenser being sufficient to maintain the power supply of the transmitting module for a long period of time, which should preferably be a minimum of 12 hours. As will be understood, a condenser is a passive element which is capable of being recharged without any difficulty, by means of applying the corresponding difference of potential to its terminals. This recharging, in the case of the present invention, will be carried out from the receiving module, through appropriate electrical contacts, which in the receiver are indicated by the references (A, B, C, D and E) and which may also be used for carrying out other functions, as explained above.

In accordance with the foregoing, the transmitting module effects transmissions controlled by the microprocessor (1) at predetermined time intervals, which in practice may be set between 5 and 10 minutes, although this must not be interpreted as restrictive, as any other time may be set that is considered more desirable.

Figure 2:
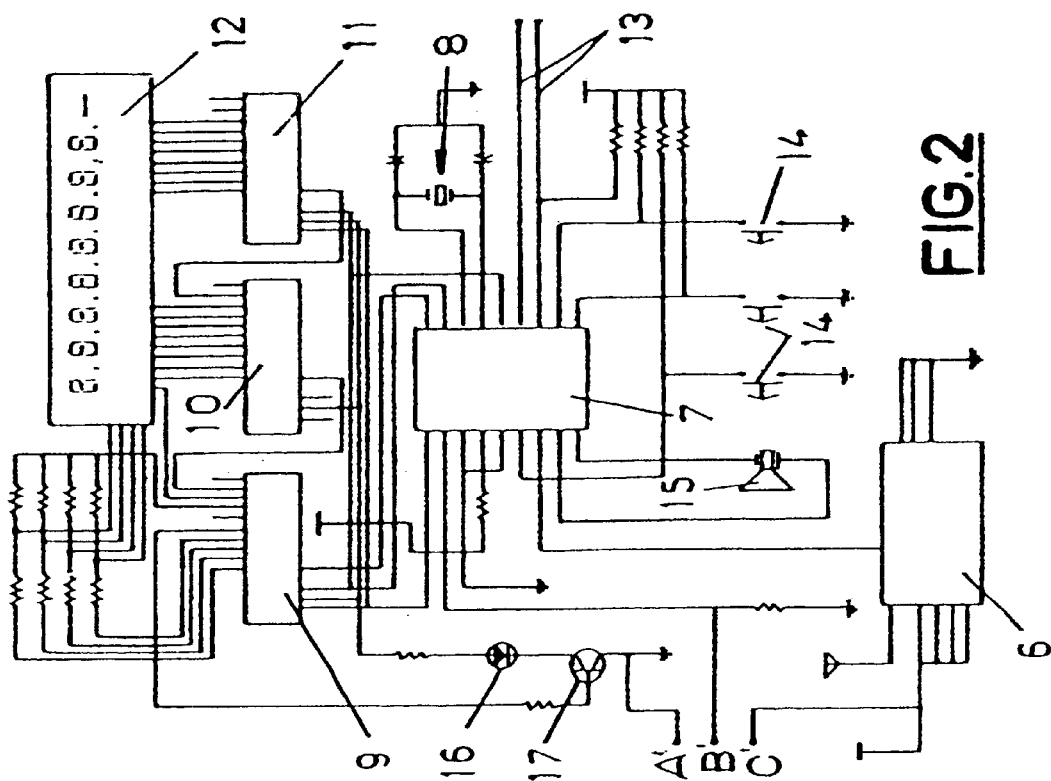
FIG. 2 shows a diagram of an electrical plan belonging to an example of an embodiment of a receiving module according to the present invention, and complementary to the transmitting module of FIG. 1.

FIG. 2 shows the electrical plan of an example of a preferred embodiment of the present invention. As may be observed, the module incorporates reception means (6) which are tuned to the same frequency as the transmitter, and by means of which the sequences received from the transmitter are detected and converted into electrical signals so as to be applied to a microprocessor (7), which has an internal oscillator controlled in frequency by a crystal (8). This module also incorporates a group of movement recorders, indicated by the numerical references (9 to 11), connected electrically to the said processor, and through which a screen (12) is controlled for viewing the different information and which, as mentioned above, will consist preferably of a liquid crystal screen.

The other elements associated with the microprocessor (7), consist basically of a serial port made up of the terminals (13), a set of buttons (14) whose function was explained hereinbefore, and the acoustic and luminous warning means, consisting of the buzzer (15) and the Led diode (16), respectively, the latter being controlled by means of a transistor (17).

Finally, the receiving circuit also has the terminals (A', B', C'), intended, and prepared, for establishing electrical communication with the terminals (A, B, C), respectively, of the transmitting module, so as to exchange the corresponding operations with the latter, and also to charge the condenser (5) used as a power supply means of the same.

As will be understood, the sequences received from the transmitter are transformed into electrical signals by the receiving means (6), so as to be processed by the microprocessor according to a programme installed in the same, and the relevant information displayed on the viewing screen (12). When a breakdown occurs in the transmitter and the relevant signal does not arrive within the period established, the microprocessor (7) will generate the relevant warning signal, activating the means provided for the purpose and displaying the relevant information on the viewing screen (12). If, on the other hand, contact is lost between the thermo-resistant probe (4) and the body whose temperature is to be controlled, the sequences transmitted by the transmitting module will correspond to temperature values which will fall within a different range to that which corresponds to the preestablished limits, this situation being detected and notified by the microprocessor (7) by generating the relevant warnings and displaying the corresponding information on the viewing screen (12).

As will be understood, by virtue of using data encoding means, the wireless telematic thermometer system described above allows the possibility of several thermometers operating simultaneously in the same area, while all the information received may be differentiated so as to be able to associate each thermometer with the radio-electrical information which corresponds to it, and which is received sequentially by the receiving module.

Preferably, the transmitting module will, in practice, be constructed inside a casing with a rounded shape, without sharp or irksome edges for the user, given the need to fix the module to the user's body.

It is not considered necessary to extend the content of this description so that an expert in the subject may understand its scope and the advantages arising from the invention, as well as how to develop and carry into practice the object of the same.

However, it must be understood that the invention has been described according to a preferred embodiment of the same, for which reason it may be liable to modifications, but this does not imply any alteration to the basic character of the said invention, as such modifications could only affect, specifically, the shape, size and/or the materials from which it is manufactured.

What is claimed is:

1. A wireless telematic thermometer, for remote measuring of the temperature of a human or animal body which has to be measured, made up of two modules, one transmitter and one receiver, of which the transmitting module is associated with the body to be controlled, and whose receiving module is situated at a remote position, which is characterised in that the transmitting module consists of:

oscillating means at a predetermined frequency, constructed around an appropriate transistor (2) and stabilised in frequency preferably by means of a quartz crystal (3); and in the said transistor's (2) collector circuit a parallel resonant circuit has been included for transmitting information to the receiving module;

microprocessing means (1), associated with a probe (4) in contact with the body whose temperature is to be controlled, which permanently provides the said microprocessor (1) with information concerning the instantaneous temperature of the said body, so that the said microprocessor may generate sequences corresponding to each of the values detected; the said microprocessor (1) also digitally modulates the operation of the above-mentioned transmitting transistor (2);

power supply means which, specifically and preferably, consist of a condenser (5) with a sufficiently high capacity to maintain the electrical power supply of the unit for a predetermined minimum period of time, preferably more than 12 hours, by virtue of the unit's low energy consumption, and terminal means (A, B, C, D, E), intended for setting codes in the transmitter from the receiver, for recharging the power supply means (5), or for possible connection, through an interface, to an appropriate computer, and in that the said receiving module consists of: receiving means (6), tuned to the same transmitting frequency as the transmitting module, and which receives the sequences sent from the latter and transforms them into corresponding electrical signals;

a microprocessing means (7), electrically connected to the said receiving means (6) from which it receives the electrical signals relating to the sequences detected, and equipped with an internal oscillator controlled in frequency by means of a quartz crystal (8);

means (9, 10, 11) of recording movement, electrically connected to the said microprocessor (7);

viewing screen means (12) preferably consisting of a liquid crystal screen or the like, for displaying the different information through the said means (9, 10, 11) of recording movement;

several buttons (14) for determining and setting the different functions;

acoustic (15) and luminous (16) warning means associated with the said microprocessor (7), and different terminal means (A', B', C'), which may be connected to the said means (A, B, C) of the said transmitting module, through which the transmission codes may be transmitted to the latter, and also through which the means (5) may be recharged with electrical energy for supplying power to the module's other components.

2. A wireless telematic thermometer, as claimed in claim 1, characterised in that the said probe (4) associated with the microprocessor (1) in the transmitting module consists, preferably, of a thermo-resistant probe, preferably of an NTC-type resistance, housed inside, and in contact with, a small capsule made of very heat-conductive metal, so that any variation in the temperature of the body to be controlled is transmitted immediately to the said element (4), and through the same to the microprocessor (1).

3. A wireless telematic thermometer, as claimed in claim 1 or 2, characterised in that the information concerning the temperature obtained by the said probe (4) is periodically sent to the receiver, at predetermined time intervals between 5 and 10 minutes.

4. A wireless telematic thermometer, as claimed in any one of claims 1 to 3, characterised in that the said buttons

(14) of the receiving module both allow one to choose the information to be viewed on the screen (12) and to establish the parameters relating to the latter's operation, such as alarm temperature, measurement system, and others, and in that the acoustic warning means preferably consist of a piezoelectric buzzer (15) and the luminous warning means consist, also preferably, of a Led-type diode (16), controlled by means of a transistor (17).

* * * * *